US009535510B2

United States Patent
Andersson et al.

(10) Patent No.: US 9,535,510 B2
(45) Date of Patent: *Jan. 3, 2017

(54) INPUT PRECISION METHOD FOR MINIMIZING ERRONEOUS ENTRIES STEMMING FROM INSTABILITY OF A MOBILE DEVICE USING AN ACCELEROMETER AND APPARATUS TO DETECT A SHAKE AND APPARATUS AND COMPUTER PROGRAM THEREOF

(71) Applicant: Telefonaktiebolaget L M Ericsson (publ), Stockholm (SE)

(72) Inventors: Ola Andersson, Spånga (SE); Michael Huber, Sundbyberg (SE); Johan Kwarnmark, Hässelby (SE); Johan Svedberg, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 16 days.

This patent is subject to a terminal disclaimer.

(21) Appl. No.: 14/641,588

(22) Filed: Mar. 9, 2015

(65) Prior Publication Data
US 2015/0177850 A1 Jun. 25, 2015

Related U.S. Application Data

(63) Continuation of application No. 12/982,871, filed on Dec. 30, 2010, now Pat. No. 8,988,365.
(Continued)

(51) Int. Cl.
*G06F 3/041* (2006.01)
*G09G 5/00* (2006.01)
(Continued)

(52) U.S. Cl.
CPC ........... *G06F 3/0233* (2013.01); *G06F 1/1626* (2013.01); *G06F 3/017* (2013.01); *G06F 3/0346* (2013.01); *G06F 3/04886* (2013.01); *H04M 1/72552* (2013.01); *H04M 2250/12* (2013.01); *H04M 2250/70* (2013.01)

(58) Field of Classification Search
CPC .................................................... G06F 3/0233
See application file for complete search history.

(56) References Cited

U.S. PATENT DOCUMENTS 5,748,512 A  5/1998 Vargas
5,768,016 A  6/1998 Kanbara
(Continued)

OTHER PUBLICATIONS

"Wireless Mini Keyboard with Accelerometer" (http://www.geekalerts.com/wireless-keyboard-accelerometer/) Aug. 19, 2010.

*Primary Examiner* — Adam R Giesy
*Assistant Examiner* — Karin Kiyabu
(74) *Attorney, Agent, or Firm* — Patent Portfolio Builders PLLC

(57) ABSTRACT

A method of correcting an error in user input is described. The method includes monitoring for an occurrence of a shake in a user equipment, detecting a shake, comparing the detected shake with a threshold value, evaluating characters within a pre-determined distance of a character entered by the user during the shake, selecting a replacement character from the evaluated characters and replacing the entered character with the replacement character.

20 Claims, 2 Drawing Sheets

Related U.S. Application Data

(60) Provisional application No. 61/379,353, filed on Sep. 1, 2010.

(51) Int. Cl.

| | | |
|---|---|---|
| *G06F 3/023* | (2006.01) | |
| *G06F 1/16* | (2006.01) | |
| *G06F 3/01* | (2006.01) | |
| *G06F 3/0346* | (2013.01) | |
| *G06F 3/0488* | (2013.01) | |
| *H04M 1/725* | (2006.01) | |

(56) References Cited

U.S. PATENT DOCUMENTS

| | | |
|---|---|---|
| 6,243,132 B1 | 6/2001 | Lee et al. |
| 6,677,932 B1 | 1/2004 | Westerman |
| 7,194,702 B1 | 3/2007 | Peasley |
| 7,508,374 B2 | 3/2009 | Tsunoda |
| 8,201,087 B2 | 6/2012 | Kay et al. |
| 2002/0063779 A1 | 5/2002 | Kaneda et al. |
| 2005/0174333 A1 | 8/2005 | Robinson et al. |
| 2005/0188330 A1 | 8/2005 | Griffin |
| 2005/0190970 A1 | 9/2005 | Griffin |
| 2005/0253806 A1 | 11/2005 | Liberty et al. |
| 2006/0224586 A1 | 10/2006 | Pickover et al. |
| 2007/0156679 A1 | 7/2007 | Kretz et al. |
| 2009/0089665 A1 | 4/2009 | White et al. |
| 2009/0247230 A1 | 10/2009 | Lundy et al. |
| 2009/0265671 A1* | 10/2009 | Sachs .............. G06F 3/017 715/863 |
| 2009/0289892 A1* | 11/2009 | Cox .............. G06F 3/017 345/156 |
| 2010/0289756 A1 | 11/2010 | Anzures et al. |
| 2010/0321286 A1 | 12/2010 | Haggerty et al. |
| 2011/0025901 A1 | 2/2011 | Tsubusaki |
| 2011/0037777 A1 | 2/2011 | Lindahl et al. |
| 2011/0086674 A1 | 4/2011 | Rider et al. |
| 2011/0115784 A1 | 5/2011 | Tartz et al. |
| 2011/0202876 A1 | 8/2011 | Badger et al. |
| 2011/0267280 A1* | 11/2011 | De Mers ............ G06F 3/04886 345/173 |

\* cited by examiner

INPUT PRECISION METHOD FOR MINIMIZING ERRONEOUS ENTRIES STEMMING FROM INSTABILITY OF A MOBILE DEVICE USING AN ACCELEROMETER AND APPARATUS TO DETECT A SHAKE AND APPARATUS AND COMPUTER PROGRAM THEREOF

RELATED APPLICATIONS

This application is a continuation of U.S. application Ser. No. 12/982,871, filed Dec. 30, 2010, which claims priority from U.S. Provisional Application No. 61/379,353, entitled "Method And System For Input Precision", filed on Sep. 1, 2010, the subject matter of which is incorporated in its entirety herein by reference.

TECHNICAL FIELD

This invention relates to input to mobile devices and more particularly to increasing input accuracy and precision.

BACKGROUND

The adaption and use of mobile devices is well known. Early devices were primarily capable of and used for making and receiving phone calls. The early devices typically included a keypad similar to a traditional telephone (i.e. numerical keys 0-9). The next generation of mobile devices provided the additional functionality of sending and receiving data such as text messages, SMS, etc. While some of these devices with texting functionality used the letters corresponding to each of the numeric keys for composing text messages, others used an alpha numeric keypad (including the keys for letters of the alphabet in addition to the numeric keys) for composing text messages.

The capabilities of mobile devices have also evolved from a basic phone to devices having memory for storing data such as contact information, calendars, etc. Other functionalities that were added include audio and video capability such as capturing digital images, capturing video, recording audio, playing back audio and video clips, etc.

Currently, mobile devices are functioning as "lite" computing devices. They provide, among other features, positioning information, navigation, accessing and browsing networks including the internet. They are also being used for sending and receiving e-mail messages. As the functionality has increased, a need for a more robust input mechanism has risen. Some devices include a full keyboard similar to that found in a portable computing device such as a laptop.

More recently, an onscreen keypad has become a part of the mobile device. Such an onscreen keypad utilizes all or a part of the existing display screen of the device for example. An onscreen keyboard also reduces the footprint of the device.

Since the onscreen keypad appears on the display portion, the "keys" are not defined as they are on a traditional keypad such as those found on a laptop for example. Therefore, accuracy in touching or pressing a portion of the display corresponding to a particular number, letter or character (on the onscreen keyboard) is highly dependent on maintaining the device (as well as the user's finger) in a stable position.

Mobile devices, by their nature, cannot maintain such a stable position unless they are stationary. Such instability increases the chances of an accidental entry of an incorrect letter, number or character by the user.

A mechanism for overcoming or minimizing such erroneous entries stemming from instability of the mobile device is highly desirable.

SUMMARY

In an exemplary method, a user equipment is disclosed. The user equipment includes, but is not limited to, a transceiver for communicating data, a memory for storing data, a sensor for detecting movement and a processor. The processor evaluates the detected movement, evaluating characters within a pre-determined distance of a character entered by a user during the movement, selects a replacement character from the evaluated characters and replaces the entered character with the replacement character.

The user equipment may be an accelerometer. The accelerometer may detect a shake associated with the user equipment. The memory may include a database or words such as a dictionary. The user equipment may further include a graphical user interface with a virtual onscreen keyboard.

In another exemplary method, a method for correcting an error in user input on a user equipment is disclosed. The method includes, but is not limited to, monitoring for an occurrence of a shake in a user equipment, detecting a shake, comparing the detected shake with a threshold value, evaluating characters within a pre-determined distance of a character entered by the user during the shake, selecting a replacement character from the evaluated characters and replacing the entered character with the replacement character.

The characters may be evaluated if the detected shake is greater than the threshold value. A magnitude of the shake may be measured and a distance from the character entered during the shake may be determined based on the magnitude of the shake. The distance may be a linear distance on a virtual keyboard of the user equipment. A notification may be provided to the user. The notification may be an aural notification and/or it may be a visual notification. The shake may be monitored by a sensor. The sensor may be an accelerometer.

In a further exemplary embodiment, a method for correcting an error in user input on a user equipment is disclosed. The method includes, but is not limited to, monitoring for an occurrence of a shake in a user equipment, evaluating the shake and determining a user entry based on the evaluation.

In a yet further exemplary embodiment, a computer program comprising computer readable program modules is disclosed. The computer program, when run on a user equipment, causes the user equipment to monitor for an occurrence of a shake in a user equipment, detect a shake, compare the detected shake with a threshold value, evaluate characters within a pre-determined distance of a character entered by the user during the shake, select a replacement character from the evaluated characters and replace the entered character with the replacement character.

BRIEF DESCRIPTION OF THE DRAWINGS

The objects and advantages of the invention will be understood by reading the following detailed description in conjunction with the drawings in which.

DETAILED DESCRIPTION

Figure 1:
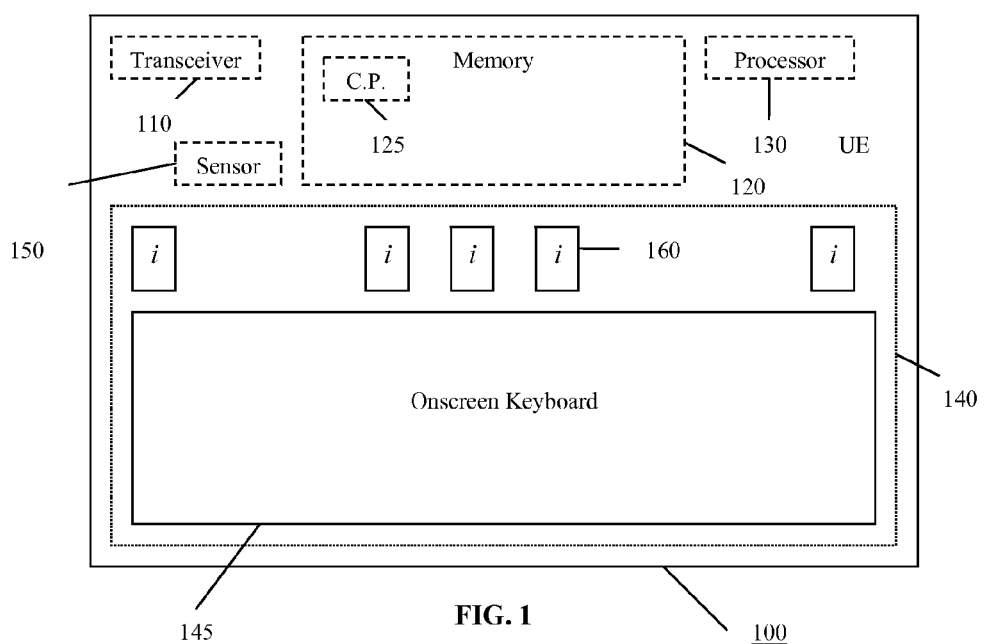
FIG. 1 illustrates a user equipment according to exemplary embodiments.

The various features of the invention will now be described with reference to the figures, in which like parts are identified with the same reference characters. The terms "mobile device", "mobile communication device" and "user equipment" are used interchangeably in the description below to refer to the same device.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors).

Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

According to exemplary embodiments, measurements from sensors included within a user equipment (UE) are utilized to provide more accuracy in user interaction with an input mechanism of the UE such as a smartphone for example.

A smartphone (or user equipment) 100 is illustrated in FIG. 1. Smartphone 100 may include, inter alia, a transceiver 110, a memory 120, a processor 130, a user interface 140 such as a graphical user interface (GUI), an on-screen virtual keyboard 145 and a plurality of icons 160 as known in the art. The on-screen virtual keyboard 145 may occupy a portion of the graphical user interface. The icons may launch a particular application such as a browser for accessing the internet or for accessing a particular website on the internet or for communicating with a particular destination for example. The icons may also be tagged with the identity (and phone number) for a particular entity such as home, spouse, work, emergency, hospital, doctor, etc.

Certain elements of Smartphone 100 (such as transceiver 110, memory 120, processor 130 and sensor 150) are illustrated using dashed lines to indicate that these elements are not visible but integrated with smartphone 100. The size, shape and other aspects of the smartphone of FIG. 1 are not intended to represent an actual Smartphone which may be of a different size, shape and include other aspects.

Smartphone 100 may also include a sensor 150 such as an accelerometer in some embodiments. Smartphones are increasingly becoming equipped with accelerometers to improve the user experience. In one application, they may be used to measure the orientation or positioning of the mobile device. If the phone is turned sideways from portrait to landscape mode, the display is also rotated automatically for example.

Accelerometers are also used in gaming applications on the mobile devices. A game simulating driving can use the tilting of the mobile device to the left or to the right to represent turning of the steering wheel of a car. A game simulating a flight can use the tilting of the mobile device to represent ascending or descending of a flight, etc.

In a shaky environment, it is often hard to accurately enter the intended character on the onscreen virtual keyboard. Such an environment can be encountered while walking or while in a moving environment such as in a car, a bus, a train, etc. The shakiness could result in entering an unintended character such as a nearby or neighboring key.

A user may intend to enter the word "FROG" for example. The user may enter "F", "R" and "O". Then, while trying to enter or entering "G", the device may be subjected to a shake and the user may enter "F". The input then becomes "FROF" which is not what the user intended.

In exemplary embodiments, an accelerometer can be utilized to detect the shake (or instability) that is experienced by the mobile device. This detection can be used to predict what the user was intending to enter at the time the device was subjected to the shake.

Since the user equipment was subjected to a shake while entering (or immediately preceding the entry of) the character "F", this character (i.e. "F") may be replaced by a wildcard to make the prediction of the character the user intended to enter.

The device may treat this entry as "FRO*" with "*" being the wild card corresponding to the entered character "F". The wild card character "*" may be a character in the vicinity of the entered character "F". The character that is identified as being entered during the shake (i.e. "F" in this example) may be used as a reference character to determine the nearby or neighboring characters. In the illustrated example above, the wild card character may be any one of "D", "E", "R", "T", "G", "C" and "V" since each of these characters is next to or around the character "F".

A dictionary or a similar type of word database may be accessed to determine that the entered word in this case is "FROG". The database may be built into the user equipment for example. The number of letters that can be compared (with the character entered during the shake) may also be a function of the magnitude of the shake. If the shake is minor, then the likelihood of the wild card character being a "neighbor" to the entered character "F" is high. If the shake is significant, the wild card character may be a little further away from the entered character ("F"). It may include, for example but not necessarily limited to, "S", "H", "4", "spacebar", etc. As a result, more letters or characters may be considered in this case.

A shake that the device is subjected to may be measured by the accelerometer in accordance with known techniques. The magnitude of the shake may be the displacement from a default position for example.

The magnitude of the shake may determine whether an erroneous entry is likely to result. That is, a small shake may not affect a user's ability to enter a character while a larger shake may affect this ability. Therefore, a small shake may not lead to an erroneous entry; a larger shake is more likely to result in an erroneous entry. A (first) threshold value may be established to determine whether the shake is large enough to result in an error in entry of a character (or characters).

Additional threshold values may also be established to determine "large" and "small" shakes or even a plurality of shakes. These may be utilized to determine how far to look beyond the entered character that might have been an erroneous entry. For advanced users, the device may provide the ability to adjust their own threshold value.

The distance in this context may refer to a linear distance from the entered character (to other characters) on a virtual keyboard. The distance between the same two characters may vary based on the size of the display which varies between different brands/models of user equipment. The distance may also differ based on the resolution of the display that is selected (either user selected or default values).

If a shake is detected by the accelerometer that exceeds the first threshold value described above, the mobile device may provide an aural or visual indication or prompt to the user to indicate that an erroneous entry may have been made. An aural indication may be particular sound that can be heard by a user such as a beep for example. A visual indication may be a flashing of the display or underlining of the character entered or the word for example. The notification may also be a vibration of the user equipment. This provides an opportunity for the user to provide a correct input or to override a predicted input provided by the device based on retrieval from a dictionary database for example.

Other predictive text input methods typically suggest or try to guess words based on a user entering at least one or more characters. In contrast, exemplary embodiments include the ability to determine an erroneous entry of even the first character of a word based on shake detection by the accelerometer.

Figure 2:
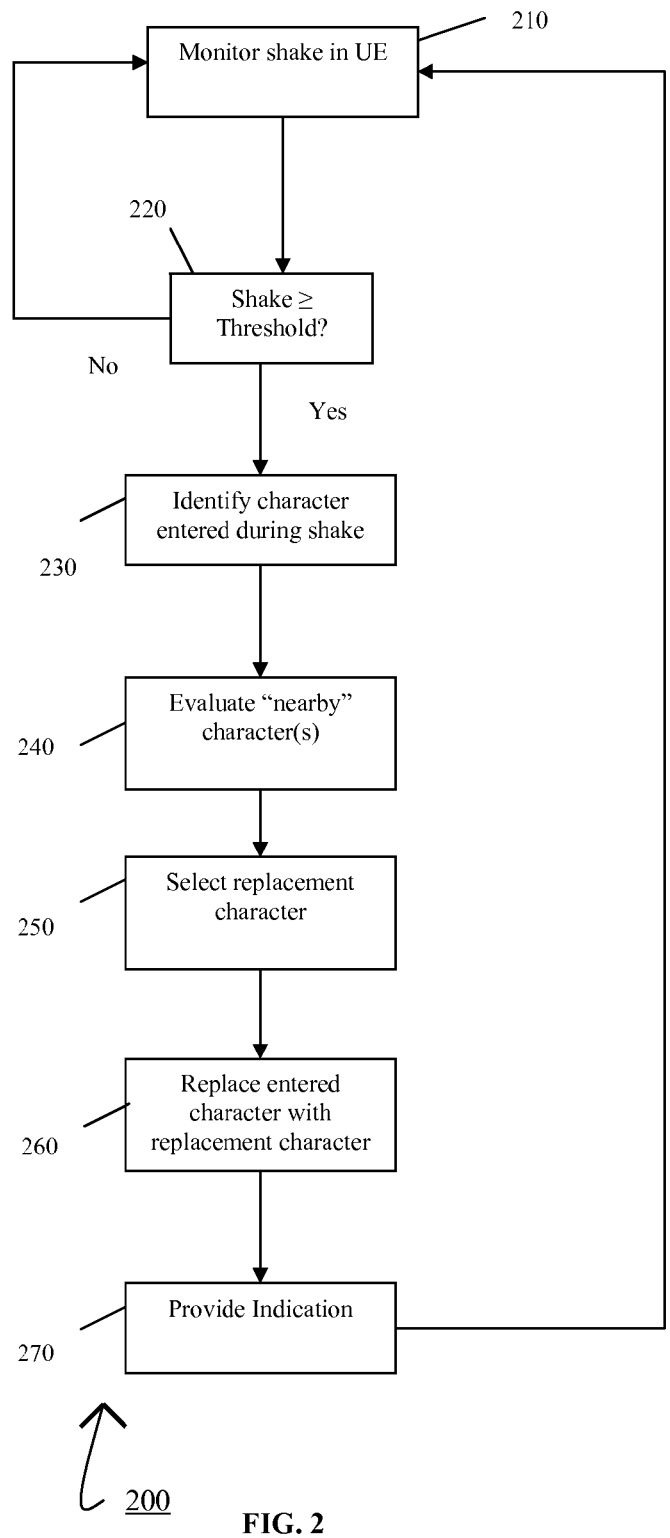
FIG. 2 illustrates a method in accordance with exemplary embodiments.

A method 200 in accordance with exemplary embodiments is illustrated in FIG. 2. An accelerometer may monitor for a shake occurring in a user equipment such as in Smartphone 100 of FIG. 1 at step 210. If a shake is detected, the detected shake may be compared to a predetermined threshold value at 220. If the shake is equal to or greater than the threshold, the character entered during the shake may be identified at 230. At step 240, all characters in the vicinity of the (erroneously) entered character may be evaluated or analyzed to determine the character that was intended to be entered by the user.

This may be accomplished by accessing a dictionary database in some embodiments. The database may be supplemented by the user in some embodiments. A replacement character may be selected from the evaluated characters at 250 based on the evaluation. The entered character may be replaced by the replacement character at step 260. An aural or visual indication may be made to the user at step 270 to represent an erroneous entry. If the shake is below the threshold (as determined at 220), the accelerometer continues monitoring the device for shake at 210.

In one embodiment, in order for the processor 130 (of FIG. 1) to be able to perform the steps illustrated in FIG. 2, the memory comprises a computer program (CP) 125 with computer program modules which when run by the processor 130 causes the user equipment to perform all or some of the steps illustrated in FIG. 2. The memory may for example be a flash memory, a RAM (Random-access memory) ROM (Read-Only Memory) or an EEPROM (Electrically Erasable Programmable ROM), and the computer program modules described above could in alternative embodiments be distributed on additional memories (not shown) in the user equipment 100. The processor may not only be a single CPU (Central processing unit), but could comprise two or more processing units in user equipment 100. For example, the processor may include general purpose microprocessors, instruction set processors and/or related chips sets and/or special purpose microprocessors such as ASICs (Application Specific Integrated Circuit). The processor may also comprise board memory for caching purposes.

While exemplary embodiments describe usage by a user, the present invention is not limited solely to a user or manual entry of characters or letters on onscreen (or, touch screen) display. Exemplary embodiments may equally be applicable when the entry is being performed by non-human means such as by a machine or a robotic means for example. Exemplary embodiments are also not limited to using only letters (both lower and upper case); it may apply to all keys on the keyboard including, but not limited to, letters, characters, spacebar, "enter" key, numerical keys, etc.

It will be appreciated that the procedures (arrangement) described above may be carried out repetitively as necessary. To facilitate understanding, many aspects of the invention are described in terms of sequences of actions. It will be recognized that the various actions could be performed by a combination of specialized circuits and software programming.

Thus, the invention may be embodied in many different forms, not all of which are described above, and all such forms are contemplated to be within the scope of the invention. It is emphasized that the terms "comprises" and "comprising", when used in this application, specify the presence of stated features, steps, or components and do not preclude the presence or addition of one or more other features, steps, components, or groups thereof.

The invention has been described with reference to particular embodiments. However, it will be readily apparent to those skilled in the art that it is possible to embody the invention in specific forms other than those of the embodiment described above.

The particular embodiments described above are merely illustrative and should not be considered restrictive in any way. The scope of the invention is given by the appended claims, rather than the preceding description, and all variations and equivalents which fall within the range of the claims are intended to be embraced therein.

The invention claimed is:

1. A user equipment comprising:
a transceiver for communicating data;
a memory for storing the data;
a sensor for detecting unintended movement of the user equipment; and
a processor for:
evaluating the detected unintended movement of the user equipment;
evaluating characters within a distance of a character entered by a user on a keyboard during the detected unintended movement, wherein the evaluated characters are selected from a set of characters based on a magnitude of the detected unintended movement or a number of a plurality of detected unintended movements;
selecting a replacement character from the evaluated characters; and
replacing the entered character with the replacement character.

2. The user equipment of claim 1, wherein the sensor is an accelerometer.

3. The user equipment of claim 2, wherein the accelerometer detects a shake associated with the user equipment.

4. The user equipment of claim 1, wherein the memory further comprises:
a database of words.

5. The user equipment of claim 1, further comprising a graphical user interface with a virtual onscreen keyboard.

6. The user equipment of claim 1, wherein an amount of the evaluated characters selected from the set of characters increases as the magnitude of the detected unintended movement increases.

7. A method of correcting an error in user input comprising:
    detecting an unintended shake of the user equipment;
    comparing the detected unintended shake with a threshold value;
    evaluating characters within a distance of a character entered by a user on a keyboard during the detected unintended shake, wherein the evaluated characters are selected from a group of characters based on a magnitude of the detected unintended shake or a number of a plurality of detected unintended shakes;
    selecting a replacement character from the evaluated characters; and
    replacing the entered character with the replacement character.

8. The method of claim 7, wherein the characters are evaluated if the detected unintended shake is greater than the threshold value.

9. The method of claim 7, further comprising:
    measuring the magnitude of the detected unintended shake;
    determining the distance from the character entered during the detected unintended shake based on the magnitude of the detected unintended shake.

10. The method of claim 9, wherein the distance is a linear distance on a virtual keyboard of the user equipment.

11. The method of claim 7 further comprising:
    providing a notification to the user.

12. The method of claim 11, wherein the notification is an aural notification.

13. The method of claim 11, wherein the notification is a visual notification.

14. The method of claim 7, wherein the detected unintended shake is monitored by a sensor.

15. The method of claim 14, wherein the sensor is an accelerometer.

16. The method of claim 7, wherein an amount of the evaluated characters selected from the group of characters increases as the magnitude of the detected unintended shake increases.

17. A method for correcting an error in user input comprising:
    evaluating a detected unintended movement of user equipment;
    identifying a subset of characters from a set of characters based on a distance of characters from a character entered by a user on a keyboard during the detected unintended movement of the user equipment, and
    a magnitude of the detected unintended movement or a number of a plurality of detected unintended movements; and
    determining a replacement character for the character entered by the user from the subset of characters.

18. The method of claim 17, wherein an amount of the subset of characters identified from the set of characters increases as the magnitude of the detected unintended movement increases.

19. A non-transitory computer readable medium storing a computer program comprising computer readable program modules which when run on a user equipment causes the user equipment to:
    detect an unintended shake of the user equipment;
    evaluate characters within a distance of a character entered by a user on a keyboard during the unintended shake, wherein the evaluated characters are selected from a group of characters based on a magnitude of the detected unintended shake or a number of a plurality of detected unintended shakes;
    select a replacement character from the evaluated characters; and
    replace the character entered by the user with the replacement character.

20. The non-transitory computer-readable medium of claim 19, wherein an amount of the evaluated characters selected from the group of characters increases as the magnitude of the detected unintended shake increases.

* * * * *